United States Patent
Weh et al.

(10) Patent No.: US 9,334,986 B2
(45) Date of Patent: May 10, 2016

(54) VALVE COMPONENT

(76) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 172 days.

(21) Appl. No.: 12/671,673

(22) PCT Filed: Aug. 1, 2008

(86) PCT No.: PCT/EP2008/006359
§ 371 (c)(1),
(2), (4) Date: Mar. 25, 2010

(87) PCT Pub. No.: WO2009/015900
PCT Pub. Date: Feb. 5, 2009

(65) Prior Publication Data
US 2010/0288961 A1 Nov. 18, 2010

(30) Foreign Application Priority Data
Aug. 1, 2007 (DE) .......................... 20 2007 010 788

(51) Int. Cl.
*F16K 27/00* (2006.01)
*F16L 13/14* (2006.01)
*F16K 15/02* (2006.01)
*F16K 15/06* (2006.01)
*F16L 29/02* (2006.01)
*F16K 25/00* (2006.01)

(52) U.S. Cl.
CPC ............ *F16L 13/141* (2013.01); *F16K 15/026* (2013.01); *F16K 15/063* (2013.01); *F16L 29/02* (2013.01); *F16K 25/005* (2013.01); *F17C 2205/037* (2013.01)

(58) Field of Classification Search
None
See application file for complete search history.

(56) References Cited

U.S. PATENT DOCUMENTS

| 191,481 | A | | 5/1877 | Scoville |
| 1,099,389 | A | * | 6/1914 | Morrison ................. 251/226 |
| 1,394,022 | A | * | 10/1921 | Jones ..................... 251/118 |
| 1,840,904 | A | * | 1/1932 | Julien .................... 137/375 |
| 2,060,748 | A | | 11/1936 | Hardy |
| 2,896,663 | A | * | 7/1959 | Mena ..................... 137/539 |
| 2,943,639 | A | * | 7/1960 | Smith .................... 137/515.7 |
| 2,959,188 | A | | 11/1960 | Kepner |
| 3,498,324 | A | * | 3/1970 | Breuning ............. 137/614.04 |

(Continued)

FOREIGN PATENT DOCUMENTS

AU       2009 100 267       4/2009
DE       297 11 841 U1      8/1998

(Continued)

OTHER PUBLICATIONS

International Search Report and Written Opinion mailed on Jan. 7, 2010, for International Application No. PCT/EP2008/006359.

(Continued)

*Primary Examiner* — Terry Cecil
(74) *Attorney, Agent, or Firm* — Knobbe Martens Olson & Bear LLP

(57) ABSTRACT

For the simple and cost-effective production of a valve component (1) in the form of a non-return valve or a connecting nipple, in particular for the refueling of natural gas vehicles, or for the pressure-tight connection to a fluid line or a plug-in coupling, wherein the valve component (1) has two housing parts (3, 4) which are connected pressure-tightly to each other and accommodate a valve (7) there within, it is proposed that the housing parts (3, 4) are pressed together at an annular groove (3').

8 Claims, 2 Drawing Sheets

(56) References Cited

U.S. PATENT DOCUMENTS

| | | | |
|---|---|---|---|
| 3,523,553 A | 8/1970 | Beck et al. | |
| 3,710,823 A | 1/1973 | Vik | |
| 3,738,688 A | 6/1973 | Racine | |
| 4,288,112 A * | 9/1981 | Stoll | 285/238 |
| 4,470,575 A * | 9/1984 | Stoll | 251/149.6 |
| 4,474,208 A | 10/1984 | Looney | |
| 4,552,336 A * | 11/1985 | Pastrone | 251/331 |
| 4,896,698 A | 1/1990 | Limiroli | |
| 5,060,982 A | 10/1991 | Matsushita | |
| 5,113,900 A | 5/1992 | Gilbert | |
| 5,167,398 A * | 12/1992 | Wade et al. | 251/149.6 |
| 5,265,844 A | 11/1993 | Westfall | |
| 5,575,510 A | 11/1996 | Weh et al. | |
| 5,749,394 A * | 5/1998 | Boehmer et al. | 137/533.15 |
| 6,095,186 A | 8/2000 | Nagel | |
| 6,189,862 B1 | 2/2001 | McKay | |
| 6,658,990 B1 * | 12/2003 | Henning et al. | 99/352 |
| 6,719,003 B2 | 4/2004 | Schroeder et al. | |
| 8,875,734 B2 | 11/2014 | Weh et al. | |
| 2002/0036015 A1 | 3/2002 | Miyajima et al. | |
| 2006/0021659 A1 | 2/2006 | Andersson | |
| 2007/0052232 A1 | 3/2007 | Gunderson | |
| 2008/0018059 A1 | 1/2008 | Otuka | |
| 2009/0267014 A1 | 10/2009 | Ishitoya et al. | |
| 2010/0288961 A1 | 11/2010 | Weh | |

FOREIGN PATENT DOCUMENTS

| | | |
|---|---|---|
| DE | 20 2007 010788 | 9/2008 |
| EP | 1 271 039 A | 1/2003 |
| EP | 1577598 | 9/2005 |
| FR | 2686680 | 7/1993 |
| WO | WO 00/52378 | 9/2000 |
| WO | WO 2012/000659 | 1/2012 |
| WO | WO 2012/003927 | 1/2012 |

OTHER PUBLICATIONS

International Preliminary Report on Patentability mailed on Feb. 2, 2010 for International Application No. PCT/EP2008/006359.
International Search Report dated Nov. 15, 2011 for PCT Application No. PCT/EP2011/003194.
International Search Report dated Nov. 18, 2011 for PCT Application No. PCT/EP2011/003027.
International Search Report and Written Opinion dated Nov. 23, 2011 for PCT Application No. PCT/EP2011/003194.
International Preliminary Report on Patentability dated Jan. 8, 2013 for PCT Application No. PCT/EP2011/003194.
International Search Report and Written Opinion dated Nov. 25, 2011, for PCT Application No. PCT/EP2011/003027.
International Preliminary Report on Patentability dated Jan. 8, 2013 for PCT Application No. PCT/EP2011/003027.

* cited by examiner

VALVE COMPONENT

BACKGROUND

1. Field

The invention relates to a valve component in form of a non-return valve or a connection fitting, in particular for the refueling of natural gas vehicles.

2. Description of the Related Art

Such a connection fitting is known from WO 00/52378 of the Applicants. Therein a quick-connect coupler is described, which can be connected to the connection fitting, wherein collets engage in the connection fitting. Thus, a coupling and pressure-tight connection is achieved, as this is required for the pressurized refueling of natural gas vehicles with relative high pressure. The connection fitting is exposed to rather high loads, such that it has to be very stable, in order to be in line with the standards for the natural gas refueling (NGV).

Such connection fittings are usually screwed together from two capsule-shaped housing parts, in which a valve is inserted with corresponding sealing surfaces. However, this concept is relatively expensive, since the manufacture of outer and internal threads is very expensive, and in addition several O-rings in corresponding grooves are required to seal the housing parts to each other and the inserted valve. Thus, assembly expenditure is rather high, as well.

SUMMARY

Thus, the invention intends to create a valve component being simplified in manufacturing and therefore inexpensive.

This object is achieved by a valve component in accordance with the present disclosure. Preferred embodiments are also disclosed herein.

By the suggested press-fitting of the two housing parts of the valve component, in particular in form of a connection fitting, it is possible to connect this without expensive threads in a safe and pressure-tight way. Thus, significant cost saving is possible. Besides significant cost saving it is possible to use only a single seal bushing instead of several O-rings. In particular, a safe sealing surface is provided by the use of a seal bushing at the joint or interface between the housing parts and at the same time a sealing surface for the incorporated valve is formed, such that a double function results. Thus, assembly is substantially simplified, so that assembling can be done e.g. by a robot, as well.

In a preferred embodiment the seal bushing is formed from a resistant plastic, preferably from PEEK, since this results in the required long-term tightness. Further to the sealing of a non-return valve in the connection fitting also a filter insert can be safely fixed, which especially follows adjacent to the seal bushing. Thus, a very compact structure of the connection fitting and/or the valve component is achieved.

BRIEF DESCRIPTION OF THE DRAWINGS

Subsequently, a preferred embodiment of the valve component, in particular in form of a connection fitting or a check valve is described and explained on the basis of the drawings. They show in.

DETAILED DESCRIPTION

Figure 1:
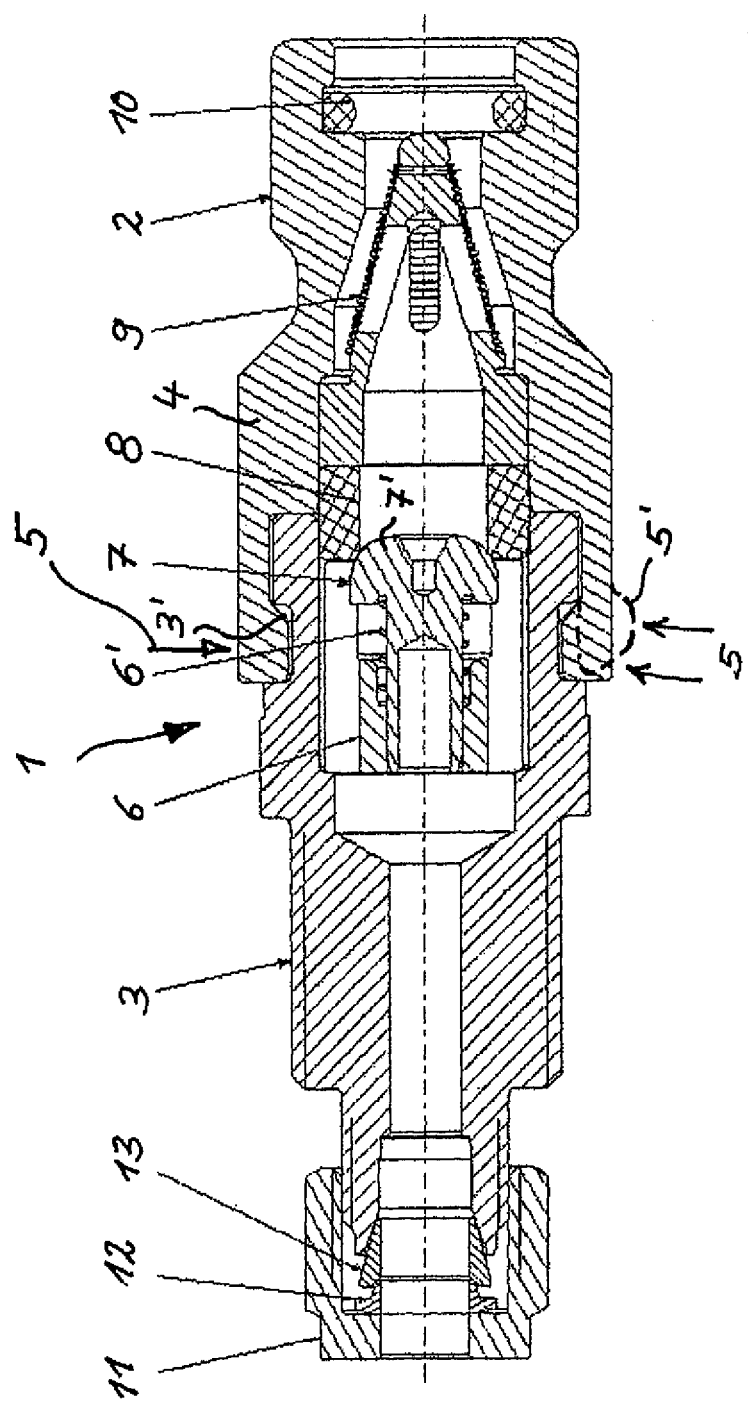
FIG. 1 a half-section of a valve component in form of a connection fitting.

FIG. 1 shows a sectional view of a valve component 1 in form of a connection fitting. The connection fitting has a connection profile 2, e.g. for a plug-on quick-connect coupler, to be connected to the pressure-tight terminal of a quick-connect coupler, shown in EP 1 271 039 of the Applicants. The valve component 1 consists of two main parts, i.e. two capsule-shaped housing parts 3 and 4, which are safely connected with one another by a grouting or press-fitting (as indicated by arrow 5). For this purpose an annular groove 3' is provided in one of the housing parts (here the left part 3), into which a bead 5' (shown in the bottom half as dash line) is pressed after putting-over the housing part 4. Thus, the two housing parts 3 and 4 are stably and safely connected with the press-fitting or grouting 5.

This grouting 5 also fixes a seal bushing 8 which is arranged at the joint or interface of the two housing parts 3 and 4 inside the connection fitting and which is preferably pressed into one of the two housing parts. Thus, a safe seal to the outside is achieved. In addition, the seal bushing 8 also serves as contact or sealing surface for an incorporated valve 7, namely a check or non-return valve. Check valve 7 has a conical nipple 7', which contacts the seal bushing 8 serving as sealing surface and is supported in a telescope element 6 with a closing spring 6'. On pressurization, in particular with the refueling, the conical nipple 7' can evade by the sliding movement against the spring 6' in the telescope element 6, here to the left, thus releasing the fluid passage to a connected tube, which is fixed e.g. by a nut 11 and sealing sections 12, 13 and leads to a natural gas reservoir.

In a preferred embodiment a filter insert 9 is positioned adjacent to the seal bushing 8, in particular in direct contact. The filter insert 9 has here a tapered outer shape, so that the tip of the filter insert 9 extends to a sealing ring 10, which is inserted in an interior groove inside the connection profile 2. This sealing ring 10 contacts a sealing piston of a quick-connect coupler (not illustrated) in the connection position, so that a pressure-tight attachment results. In this connected position collets (or balls as known from hydraulic couplings) engage with the connection profile 2. Such a structure of the quick-connect coupler is exemplified in WO 00/52378 of the Applicants, as initially specified. Altogether a very simple and variable connection fitting is provided, in particular for a refueling nipple of natural gas vehicles.

Figure 2:
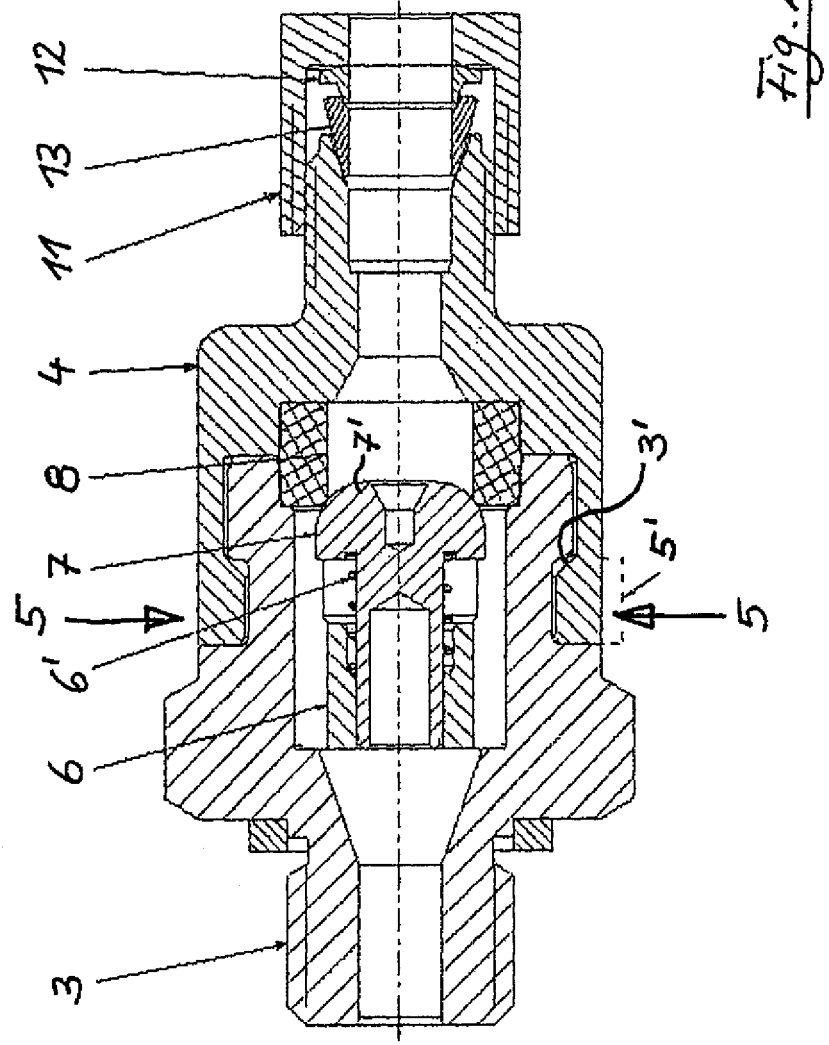
FIG. 2 a check valve designed in a similar way.

FIG. 2 shows the configuration of a check valve, wherein members of the same function are referred to with the same reference numerals as in FIG. 1. By the absence of the elongated connection profile 2 and the filter insert 9 the valve component 1 is even more compact. The nut 11 with the sealing sections 12, 13 to a fluid line is here provided at the right half. The housing parts 3 and 4, as well as the grouting 5 (by pressing the bead 5' into the annular groove 3', preferably by means of a hose press) are similar to FIG. 1. The same applies to the seal bushing 8, which preferably consists of a resistant polyetheretherketone (PEEK). This material offers a high tightness even at extreme temperatures below freezing and medium stability, which can lead to problems with conventional O-rings. As material for the housing parts 3 and 4 it is recommendable to use a ductile, cold-deformable material for the housing part with the bead 5' to be pressed into the housing part (here 3) with the ring groove 3', being formed of high-strength steel. Thus, the press-fitting 5 can be manufactured with relative small energy.

The invention claimed is:

1. A valve component in a form of a non-return valve or a connecting nipple, the valve component comprising:
   a first housing part connected pressure-tightly to a second housing part at a radially extending joint line forming a chamber accommodating a valve and a seal bushing therein, the joint line having a most radially inward point defined by an interface between an axial end surface of the second housing part and a radially extending surface of the first housing part that is located rearward of an axial end surface of the first housing part, wherein the first housing part at least partially surrounds the second housing part and the joint line, the first and second housing parts not screwed together, the first housing part press-fitted to the second housing part, a radially inward surface of the first housing part including a bead integral therewith and deformed into to an annular groove in a radially outward surface of the second housing part, the bead being more ductile than the annular groove, wherein an exterior surface of the seal bushing contacts an interior facing surface of both of the housing parts and contacts and spans the joint line, including the most radially inward point of the joint line, such that, when the chamber is pressurized, the valve moves between a first position abutting the seal bushing and a second position away from the seal bushing and the seal bushing is pressed against the interior surface of both of the housing parts to further secure the housing parts together.

2. A valve component according to claim 1, wherein the seal bushing further forms a sealing surface for the valve.

3. A valve component according to claim 2, wherein the seal bushing is pressed into one of the two housing parts.

4. A valve component according to claim 3, wherein a filter insert follows in an axial direction to the seal bushing and is pressed together with the seal bushing into one of the two housing parts.

5. A valve component according to claim 4, wherein the filter insert has a tapered outer shape.

6. A valve component according claim 2, wherein the seal bushing comprises plastic.

7. A valve component according to claim 6, wherein the plastic is polyetheretherketone (PEEK).

8. The non-return valve of claim 1, wherein the annular groove comprises high-strength steel.

* * * * *